(12) United States Patent
Otter et al.

(10) Patent No.: US 7,464,083 B2
(45) Date of Patent: Dec. 9, 2008

(54) COMBINING MULTI-DIMENSIONAL DATA SOURCES USING DATABASE OPERATIONS

(76) Inventors: Wolfgang Otter, Neldensteiner Hoehe 16, 74937 Spechbach (DE); Christel Rueger, Birkenhainer Strasse 59, 63450 Hanau (DE); Stefan Dipper, Suedliche Zufahrt 40, 69168 Wiesloch (DE); Tobias Hagen, Beethovenstr. 16, 69121 Heidelberg (DE)

( * ) Notice: Subject to any disclaimer, the term of this patent is extended or adjusted under 35 U.S.C. 154(b) by 103 days.

(21) Appl. No.: 11/321,746

(22) Filed: Dec. 28, 2005

(65) Prior Publication Data

US 2007/0094236 A1  Apr. 26, 2007

Related U.S. Application Data

(60) Provisional application No. 60/730,207, filed on Oct. 24, 2005.

(51) Int. Cl.
*G06F 17/30* (2006.01)
*G06F 17/00* (2006.01)

(52) U.S. Cl. ............. 707/4; 707/5; 707/10; 707/100; 707/102

(58) Field of Classification Search ............. 707/2–5, 707/10, 100–102, 104.1
See application file for complete search history.

(56) References Cited

U.S. PATENT DOCUMENTS

| | | | | |
|---|---|---|---|---|
| 5,603,024 A * | 2/1997 | Goldring | ............. | 707/203 |
| 5,897,632 A | 4/1999 | Dar et al. | | |
| 5,991,754 A * | 11/1999 | Raitto et al. | ............. | 707/2 |
| 6,003,024 A * | 12/1999 | Bair et al. | ............. | 707/3 |
| 6,192,357 B1 * | 2/2001 | Krychniak | ............. | 707/2 |
| 6,233,573 B1 * | 5/2001 | Bair et al. | ............. | 707/3 |
| 6,480,836 B1 * | 11/2002 | Colby et al. | ............. | 707/3 |
| 6,505,189 B1 * | 1/2003 | On Au et al. | ............. | 707/2 |
| 6,609,123 B1 * | 8/2003 | Cazemier et al. | ............. | 707/4 |
| 6,636,870 B2 * | 10/2003 | Roccaforte | ............. | 707/104.1 |
| 6,775,682 B1 * | 8/2004 | Ballamkonda et al. | ............. | 707/102 |
| 7,010,538 B1 * | 3/2006 | Black | ............. | 707/100 |
| 7,035,843 B1 * | 4/2006 | Bellamkonda et al. | ............. | 707/3 |
| 7,185,016 B1 * | 2/2007 | Rasmussen | ............. | 707/100 |
| 7,191,169 B1 * | 3/2007 | Tao | ............. | 707/2 |
| 2003/0009464 A1 * | 1/2003 | Campbell et al. | ............. | 707/10 |
| 2003/0055832 A1 * | 3/2003 | Roccaforte | ............. | 707/100 |
| 2003/0208506 A1 * | 11/2003 | Greenfield et al. | ............. | 707/102 |
| 2004/0122814 A1 | 6/2004 | Zhang et al. | | |
| 2004/0215626 A1 * | 10/2004 | Colossi et al. | ............. | 707/100 |
| 2005/0027721 A1 | 2/2005 | Saenz | ............. | 707/100 |

(Continued)

OTHER PUBLICATIONS

"Design data marts for data warehouses"—ACM TOSEM, vol. 10, issue 4, ACM Oct. 2001—pp. 452-483.*

(Continued)

*Primary Examiner*—Jean Bolte Fleurantin
*Assistant Examiner*—Anh Ly

(57) ABSTRACT

A system, method and computer program product for linking multidimensional data sources in a relational database using database joins are disclosed. Attributes from a join query are filtered. The attributes include characteristics and restrictions of the join query. A subset of the attributes that are relevant to the multidimensional data source are extracted. A partial join query is generated from the extracted subset of the attributes. The partial join query includes characteristics and restrictions that are relevant to the multidimensional data source. It makes use of aggregated data defined for the multidimensional data source if appropriate.

8 Claims, 3 Drawing Sheets

| Aggregates | Characteristics Contained | Filter Conditions | Number of Rows |
|---|---|---|---|
| InfoCube | Material<br>Material group<br>Subsidiary<br>Country<br>Customer | - | 10000000 |
| Aggregate 1 | Customer | - | 10000 |
| Aggregate 2 | Material | customer = ‚Maier' | 500 |

U.S. PATENT DOCUMENTS

| | | | |
|---|---|---|---|
| 2005/0033741 A1* | 2/2005 | Dombroski et al. | 707/3 |
| 2005/0060300 A1* | 3/2005 | Stolte et al. | 707/3 |
| 2005/0065940 A1 | 3/2005 | Bakalash et al. | 707/100 |
| 2005/0076045 A1 | 4/2005 | Stenslet et al. | 707/101 |
| 2005/0091237 A1 | 4/2005 | Bakalash et al. | 707/100 |
| 2005/0138001 A1* | 6/2005 | Mittal et al. | 707/2 |
| 2005/0165741 A1* | 7/2005 | Gordon | 707/3 |
| 2005/0262071 A1* | 11/2005 | Prager | 707/4 |
| 2006/0122964 A1* | 6/2006 | Yu et al. | 707/2 |
| 2007/0061287 A1* | 3/2007 | Le et al. | 707/2 |
| 2007/0130180 A1* | 6/2007 | Rasmussen | 707/100 |

OTHER PUBLICATIONS

"A Case for Dynamic View Management"—ACM TODS vol. 26, issue 4 ACM Dec. 2001, Yannis Kotidis and Nick Roussopoulos—pp. 388-423.*

"User-cognizant multidimensional analysis"—Sunita Sarawagi—The VLDB Journal vol. 10, issue 2-3, ACM Sep. 2001, pp. 224-239.*

Akinde, Michael et al., "The MD-join: An Operator for Complex OLAP", Proceedings, 17th International Conference on Data Engineering (ICDE'01), pp. 524-533 (2001).

Colby, Latha et al., "Red Brick Vista™: Aggregate Computation and Management", Proceedings of the 14$^{th}$ International Conference on Data Engineering; pp. 174-177 (1998).

Gupta, Ashish et al., "Aggregate-Query Processing in Data Warehousing Environments", Proceedings of the 21th international Conference on Very Large Data Bases, pp. 358-369 (1995).

* cited by examiner

| Aggregates | Characteristics Contained | Filter Conditions | Number of Rows |
|---|---|---|---|
| InfoCube | Material<br>Material group<br>Subsidiary<br>Country<br>Customer | - | 10000000 |
| Aggregate 1 | Customer | - | 10000 |
| Aggregate 2 | Material | customer = ,Maier' | 500 |

FIG. 2

| Aggregates | Characteristics Contained | Filter Conditions | Number of Rows |
|---|---|---|---|
| Info Cube | Material<br>Material Group<br>Subsidiary<br>Country<br>Customer | - | 10000000 |
| Aggregate 1 | Customer | - | 10000 |
| Aggregate 2 | Material | Customer = 'Maier' | 500 |

COMBINING MULTI-DIMENSIONAL DATA SOURCES USING DATABASE OPERATIONS

CROSS REFERENCE TO RELATED APPLICATIONS

The present application claims priority under 35 U.S.C. §119 to U.S. Provisional Application Ser. No. 60/730,207, filed Oct. 24, 2005, entitled COMBINING MULTI-DIMENSIONAL DATA-SOURCES USING DATABASE JOINS, the disclosure of which is incorporated herein by reference.

BACKGROUND

The subject matter described herein relates to the combination of multi-dimensional data sources using database operations. Within relational databases, an important tool for linking information is a join. A join links the contents of two or more database tables (referred to hereinafter simply as "tables"). The result of the linking is displayed in the form of another table.

The combining of tables is described using one or more ON conditions within a select statement. An ON condition describes a condition between two tables, whereby one field of each table has to be contained in this condition. Equal join conditions are usually used. They have the format: Field1 (Table1)=Field2(Table2). Database systems typically permit any ON conditions. A result set is generated when a join is processed. The following instances are based on the assumption that all fields of all tables are contained in the result set. This is possible without restrictions, so long as the process of obtaining the result set is of most interest.

A table is referred to as Ti, a record of this table is referred to as $ti \in Ti$. A record which contains initial values only is referred to as $\epsilon$. Linking two tables with a join is referred to with T1 join T2 or T1 left outer join T2. The result set is referred to as TE. A record in the result set $tE \in TE$ has the structure $tE=(t1, \ldots, tn)$. Each subrecord $ti \in Ti$ is a record of table Ti that is contained in the join. The fields of a record in a table Ti are called field(ti). Within system query language (SQL) statements, tables are for example called T1 and their fields are referred to as T1.FIELD.

First the result set is determined on the basis of the ON conditions. The result set is then restricted on the basis of a WHERE condition. The result set fulfills the following conditions: every record contains, for every table affected, an element whose structure corresponds to the structure of the table; all ON conditions within a record are fulfilled; all WHERE conditions within a record are fulfilled; and there are no combinations of data records in the database which fulfill the ON and WHERE conditions but which are not contained in the result set.

The following method describes the first step in calculating the result set for two tables T1 and T2, where only the ON conditions are taken into consideration.

Method 1: T1 join T2

1. Examine each record $t1 \in T1$ in accordance with the second step.
2. Compare each record $t2 \in T2$ with record t1. If the ON conditions are fulfilled then insert a record $tE=(t1, t2)$ into the result set.

This method only determines the way in which the result set is generated. Most database systems use other, more effective methods. If more than two tables are involved, method 1 can be used, but must be applied in several steps. The sequence of the tables is arbitrary. With regard to method 1, each record $t1 \in T1$ or $t2 \in T2$ can appear as a subrecord in several records of the result set, and a record $t1 \in T1$ or $t2 \in T2$ may not appear as a subrecord in the result set at all.

In many evaluations, the second case is not desirable. Users often want a record from one of the tables in the result set, even if no suitable record exists in the corresponding table. Therefore, in the SQL standard, so-called outerjoins are defined. In this document, only left outer joins are discussed. With a left outer join, method 1 has to be enhanced slightly as follows.

Method 2: T1 left outer join T2

1. Examine each record $t1 \in T1$ in accordance with the second step
2. Compare each record $t2 \in T2$ with record t1. If the ON conditions are fulfilled, insert a record $tE=(t1, t2)$ into the result set. If at least one data record is inserted into the result set in this way, return to step 1. Otherwise go to step 3.
3. Insert a record $tE=(t1, \epsilon)$ into the result set where the values of subrecord t2 are initial.

This method can also be used if more than two tables are involved. It then has to be applied in several steps. In this case the sequence of the tables is no longer arbitrary.

The join methods described above are best suited for flat structures, such as database tables. In the context of a data warehouse, however, multidimensional data structures (InfoCubes) are usually used for evaluations, where key figures are characterized by a multiplicity of characteristics that are arranged in different dimensions. Additionally, data structures of this type often need to be combined with other multidimensional or one-dimensional data structures using a type of join. Therefore, joins for multidimensional data sources must have effective access paths.

An Infoprovider represents a view of data that can be used to define queries. At runtime, the query instructs the InfoProvider to supply data. The query defines the data that is needed and the selection criteria that are used.

InfoSets are a type of infoProvider. InfoSets allow several data sources to be linked using a join. The linking of the data sources is defined during definition of the Infoset. Later queries executing the joins are run.

Because the definition of joins (as described above) always refers to tables, only data sources can be linked that possess a flat (tabular) structure; only data sources can be linked that are represented in the database.

SUMMARY

This document describes a system, method and computer program product for linking data sources in a relational database using database joins and other database operations suitable for tables. In one aspect, a computer-implemented method includes filtering attributes from a join query. The attributes include characteristics and restrictions of the join query. The method further includes the steps of extracting a subset of the attributes that are relevant to the multidimensional data source, and generating a partial join query from the extracted subset of the attributes. The partial join query includes characteristics and restrictions that are relevant to the multidimensional data source. It makes use of aggregated data defined for the multidimensional data source if appropriate.

In another aspect, a computer-implemented method of linking two or more multidimensional data sources using database joins includes the step of filtering attributes from a join query, and extracting a subset of the attributes that are relevant to the two or more multidimensional data sources. The method further includes the step of generating a partial join query from the extracted subset of the attributes.

In yet another aspect, a computer program product, tangible embodied on a computer-readable medium, operable to cause a data processing apparatus to link multidimensional and flat data sources in a relational database using database joins, is configured to filter attributes from a join query, the attributes including characteristics and restrictions of the join query, and extract a subset of the attributes that are relevant to the multidimensional data source. The computer program product is further configured to generate a partial join query from the extracted subset of the attributes, the partial join query including characteristics and restrictions that are relevant to the multidimensional data source.

The methods described to combine multidimensional data sources can use any kind of operation suitable for combining tables, also including right outer joins, full outer joins, unions and intersections.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
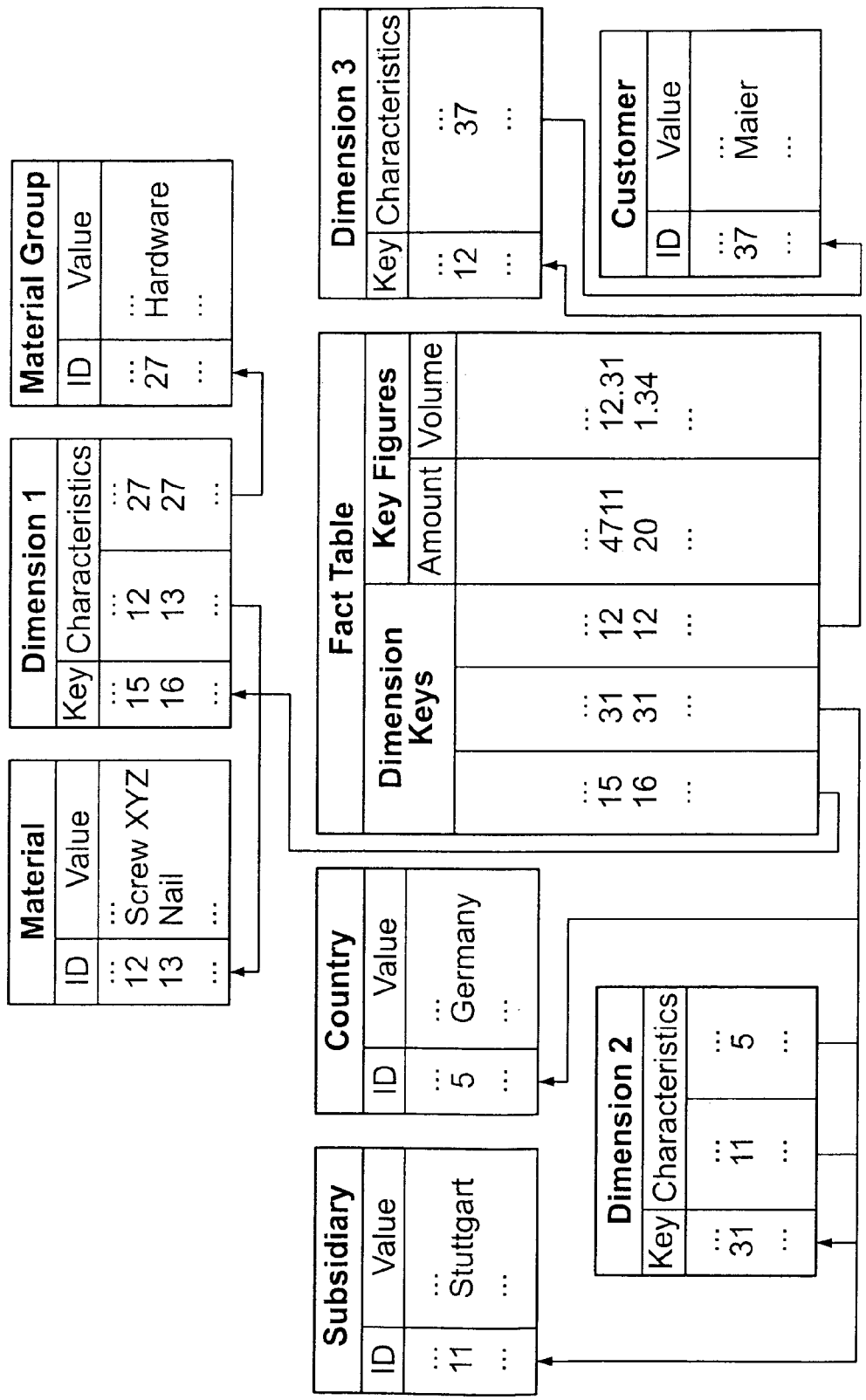
FIG. 1 is an InfoCube schema of tables according to exemplary embodiments.

Within a relational database, multidimensional data structures have to be stored using a relational data model, referred to herein as an "InfoCube." FIG. 1 shows an InfoCube schema of tables. InfoCubes are also a type of InfoProviders. InfoCubes include a number of tables that are arranged in a star schema. This star schema is usually an enhanced star schema, also called a snowflake schema. Within a data warehouse such as SAP's Business Warehouse (BW), an InfoCube includes a fact table containing the key figures, and characteristics assigned to the key figures. The characteristics are not directly contained in the fact table, but are combined in dimension tables. A dimension is a simple grouping of characteristics that do not necessarily have hierarchical dependencies. A dimension can contain characteristics that have linear dependencies, although this is not mandatory.

The dimension table has been adopted in order to overcome database restrictions to the number of columns in combined indexes and to keep the number of indexes in the fact table relatively small. This reduces the effort needed to build up the indexes during the data load. For example, the BW system allows a maximum of sixteen dimensions.

Referential integrity exists within the InfoCube from the inner table moving outwards. This means that for each dataset in the fact table, exactly one row exists in each dimension table, and for each dimension table row there is exactly one row in each corresponding characteristic table. This means that you have to create a 'not assigned' # record where no characteristic value exists.

The result of a query based on a relational store for multidimensional structures is returned in a table structure, like all SQL query results. To achieve this the fact table is joined with all required dimension tables. Because of the referential integrity within the tables of the InfoCube, only those dimension tables whose characteristics are either part of a filter condition or are requested within the result set have to be joined with the fact table. You do not have to include dimensions whose characteristics are not contained in the query.

Select
Customer.value as customer,
material.value as material,
Sum(facttable.volume) as volume,
Sum(facttable.amount) as amount
from
facttable join dimension3
on facttable.dimension_key3=dimension3.key
join customer
on dimension3.customer=customer.ID
join dimension1
on facttable.dimension_key1=dimension1.key
join material
on dimensionl.material=material.ID
where
customer.value=‚Maier'
group by
customer.value,
material.value The results for this example are as follows:

| customer | material | amount | volume |
| --- | --- | --- | --- |
| Maier | Screw XYZ | 12.31 | 4711 |
| Maier | Nail | 1.34 | 20 |
| ... | | | |

For performance reasons aggregated stores (so-called aggregates) are used, which store InfoCube data redundantly. Contrary to the preformatted views or joins that are used by many database engines, these aggregates are also InfoCubes in terms of their structure; they are still multidimensional stores. The number of aggregates that can be defined for an InfoCube is unrestricted.

Aggregates reduce the amount of data in the underlying InfoCube in two ways. First, data is compressed, because the characteristics for the InfoCube are omitted from aggregate definition. This means the detail information is reduced. Second, data is filtered by specifying filter values in the aggregate definition for single characteristics of the InfoCube. This means only parts of the InfoCube are stored in the aggregate.

When data is requested, a decision can be made whether to use the InfoCube itself or an aggregate. The decision can be made based on rules using the following method:

A determination is made whether an aggregate be used to respond to a query. As part of this determination, it is determined whether the aggregate contains all the characteristics requested by the query. Also, it is determined whether all filter conditions of the query can be met using either the filter conditions the aggregate is based on, or using the characteristics contained in the aggregate.

Figures 2, 3:
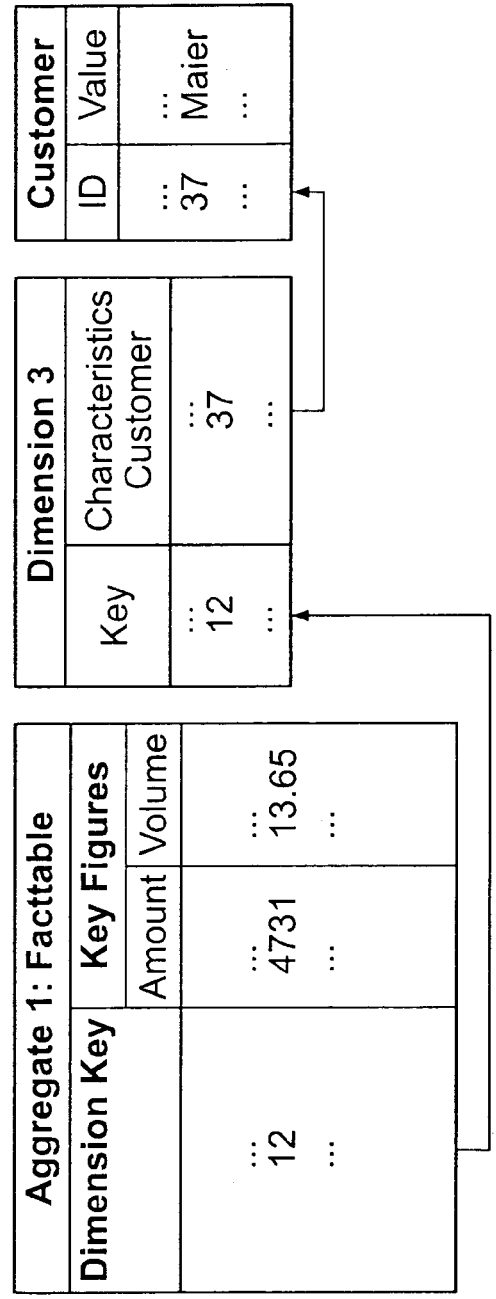
FIG. 2 illustrates sample aggregates in accordance with various exemplary embodiments.
FIG. 3 shows a schema of sample aggregates in accordance with various exemplary embodiments.

FIG. 2 shows an example of the aggregates. The number of data records in an aggregate can be used to evaluate the quality of the aggregate selected. If several aggregates qualify, the aggregate with the least number of data records is used. FIG. 3 shows a schema of sample aggregates. A query suitable for aggregate 1 can only contain the characteristic customer:

```
Select
   Customer.value as customer,
   Sum(Aggregate1_facttable.volume) as Volume,
   Sum(Aggregate1_facttable.amount) as amount
from
   Aggregate1_facttable join Dimension3
   on
Aggregate1_facttable.dimension_key3=Dimension3.key
   join customer
   on Dimension3.customer=customer.ID
   group by
   customer.value
```

The results for this example are as follows:

| customer | Volume | Amount |
|---|---|---|
| Maier | 13.65 | 4731 |
| Müller | 10.00 | 100 |

To join a relational store of multidimensional structures to other data sources during a query on an InfoSet, the multidimensional structure appears in the form of a one-dimensional table. A flat view of the multidimensional structure is necessary. A SQL select statement on the multidimensional structure delivers a flat view of the structure. The multidimensional structure is projected into a flat data source either using a nested SQL statement or by creating a database view on top of the multidimensional structure. The chosen technique depends on the underlying database platform. One method for generating a 'flat view' for an InfoCube during a query is as follows:

In accordance with some embodiments, a method is executed as follows. The characteristics and restrictions from the InfoSet query are examined. Those characteristics and restrictions that are relevant for the InfoCube are extracted and a partial query is built from the relevant characteristics and restrictions. The method for selecting an aggregate for a query is also used to find an aggregate suitable for answering the partial query for the InfoCube. Due to referential integrity (as with a normal InfoCube query), only those tables of the InfoCube are included that are necessary for the partial query.

A database view is created. The database view contains the SQL select statement for the partial query. The InfoSet SQL select statement uses this view as a normal table. Alternatively, the SQL select statement for the partial query is inserted into the SQL select statement for the InfoSet as a nested table expression.

Using this method, a multidimensional structure can be handled like a one-dimensional store, without losing the advantages of the multidimensional structure. The advantages being able to use aggregates. Further, only those tables of the InfoCube that are needed to answer the query are joined. This method has to be applied to every InfoCube contained in the InfoSet. For example, in the DataStore object customer rating, all customers are stored with a specially calculated rating number. This rating number can change frequently and expresses the relevance of a customer to a specific business area. For all customers with a rating >50, the volume has to be determined.

In accordance with an exemplary embodiment, a method is executed as follows. The relevant characteristics and key figures for the InfoCube are customer and volume. A check of all possible aggregates shows that aggregate 1 can answer the query for all customers. For the partial query the following SQL select statement is built (the view volume_cube is defined using this SQL statement):

```
select
   Customer.value as customer,
   sum(Aggregate1_facttable.volume) as volume
from
   Aggregate1_facttable join dimension3
   on
      Aggregate1_facttable.dimension_key3=dimension3.key
   join customer
      on dimension3.customer=customer.ID
   group by
   customer.value
```

The SQL statement for the complete InfoSet query is as follows:

```
select
   customer_rating.customer,
      customer_rating.rating,
   volume_cube.volume
from
   customer_rating join volume_cube
      on customer_Rating.customer=volume_cube.customer
   where
   customer_rating.rating >50
```

When using nested SQL statements, the combined statement is as follows:

```
select
    customer_rating.customer,
        customer_rating.rating,
    volume_cube.volume
from
    customer_rating join (
        select
            Customer.value as customer,
            sum(Aggregate1_facttable.volume) as volume
        from
            Aggregate1_facttable join dimension3
                on Aggregate1_facttable. dimension _key3
                    = dimension3.key
            join customer
                on dimension3.customer = customer.ID
                    group by
                        customer.value )
        on customer_Rating.customer = volume_cube.customer
    where
    customer_rating.rating > 50
```

Other operations, such as unions or intersections, combining multidimensional data sources with other data sources can be likewise achieved by defining a partial query for the InfoCube and linking it into the complete query using either a nested SQL statement or a database view.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method of linking data sources in a multidimensional database using database joins, the method comprising:

filtering join query attributes from a join query, the join query attributes including join query characteristics and join query restrictions;

identifying one or more qualified aggregated data stores that contain all of the join query characteristics and join query restrictions, each of the one or more qualified aggregated data stores redundantly storing, in a multidimensional format, only a part of the multidimensional database based on aggregate filter values for single database characteristics of the multidimensional database that are specified in an aggregated data store definition for each of the one or more qualified aggregated data stores;

selecting a smallest qualified aggregated data store out of the one or more qualified aggregated data stores for use in responding to the join query, the smallest qualified aggregated data store having a smallest number of data records of the one or more aggregated data stores;

extracting a subset of the join query attributes that are relevant to the multidimensional database;

generating a partial join query from the extracted subset of the attributes, the partial join query including database characteristics and database restrictions that are relevant to the multidimensional database;

creating a one-dimensional database view of the multidimensional database based on the smallest qualified aggregated data store;

executing the join query on the multidimensional database according to the one-dimensional database view; and answering the partial join query using the smallest qualified aggregated data store.

2. A computer-implemented method in accordance with claim 1, further comprising executing the partial join query on the data sources.

3. A computer-implemented method in accordance with claim 2, further comprising generating a number of data records from the partial join query.

4. A computer-implemented method of linking two or more multidimensional data sources using database joins, the method comprising:

filtering join query attributes from a join query, the join query attributes including join query characteristics and join query restrictions;

identifying one or more qualified aggregated data stores that contain all of the join query characteristics and join query restrictions for a corresponding one of the multidimensional data sources, each of the one or more qualified aggregated data stores redundantly storing, in a multidimensional format, only a part of the corresponding multidimensional database based on aggregate filter values for single database characteristics of the corresponding multidimensional database that are specified in an aggregated data store definition for each of the one or more qualified aggregated data stores;

selecting a smallest qualified aggregated data store for each of the two or more multidimensional data sources out of the one or more qualified aggregated data stores corresponding to each of the two or more multidimensional data sources for use in responding to the join query, the smallest qualified aggregated data store corresponding to each of the two or more multidimensional data sources having a smallest number of data records of the one or more aggregated data stores;

extracting a subset of the join query attributes that are relevant to the two or more multidimensional data sources;

generating a partial join query from the extracted subset of the join query attributes, the partial join query including data source characteristics and data source restrictions that are relevant to the two or more multidimensional data sources;

creating a one-dimensional database view of the two or more multidimensional data sources based on the smallest qualified aggregated data store;

executing the join query on the two or more multidimensional data sources according to the one-dimensional database view; and answering the partial join query using the smallest qualified aggregated data store corresponding to each of the two or more multidimensional data sources.

5. A computer-implemented method in accordance with claim 4, further comprising executing the partial join query on the data sources.

6. A computer-implemented method in accordance with claim 5, further comprising generating a number of data records from the partial join query.

7. A computer program product, tangibly embodied on a memory device, operable to cause a data processing apparatus to link data sources in a multidimensional database using database joins, the computer program product being configured to:

filter attributes from a join query, the attributes including join query characteristics and join query restrictions;

identify one or more qualified aggregated data stores that contain all of the join query characteristics and join query restrictions, each of the one or more qualified aggregated data stores redundantly storing, in a multidimensional format, only a part of the multidimensional database based on aggregate filter values for single database characteristics of the multidimensional database that are specified in an aggregated data store definition for each of the one or more qualified aggregated data stores;

select a smallest qualified aggregated data store out of the one or more qualified aggregated data stores for use in responding to the join query, the smallest qualified aggregated data store having a smallest number of data records of the one or more aggregated data stores;

extract a subset of the join query attributes that are relevant to the multidimensional database;

generate a partial join query from the extracted subset of the join query attributes, the partial join query including database characteristics and database restrictions that are relevant to the multidimensional database;

create a one-dimensional database view of the multidimensional database based on the smallest qualified aggregated data store;

execute the join query on the multidimensional database according to the one-dimensional database view; and answer the partial join query using the smallest qualified aggregated data store.

8. A computer program product in accordance with claim 7, being further configured to execute the partial join query on the data sources.

* * * * *